(12) United States Patent
Bu et al.

(10) Patent No.: US 10,176,287 B2
(45) Date of Patent: Jan. 8, 2019

(54) STI STRESS EFFECT MODELING METHOD AND DEVICE OF AN MOS DEVICE

(71) Applicant: The Institute of Microelectronics of Chinese Academy of Sciences, Beijing (CN)

(72) Inventors: Jianhui Bu, Beijing (CN); Shuzhen Li, Beijing (CN); Jiajun Luo, Beijing (CN); Zhengsheng Han, Beijing (CN)

(73) Assignee: The Institute of Microelectronics of Chinese Academy of Science, Beijing (CN)

( * ) Notice: Subject to any disclaimer, the term of this patent is extended or adjusted under 35 U.S.C. 154(b) by 676 days.

(21) Appl. No.: 14/403,938

(22) PCT Filed: Apr. 25, 2014

(86) PCT No.: PCT/CN2014/076252
§ 371 (c)(1),
(2) Date: Nov. 25, 2014

(87) PCT Pub. No.: WO2015/109679
PCT Pub. Date: Jul. 30, 2015

(65) Prior Publication Data
US 2016/0259876 A1    Sep. 8, 2016

(30) Foreign Application Priority Data

Jan. 27, 2014 (CN) .......................... 2014 1 0040388

(51) Int. Cl.
*G06F 17/50* (2006.01)
(52) U.S. Cl.
CPC ...... *G06F 17/5068* (2013.01); *G06F 17/5009* (2013.01); *G06F 17/5063* (2013.01); *G06F 2217/80* (2013.01)

(58) Field of Classification Search
CPC .......... G06F 17/5068; G06F 17/5009; G06F 17/5063; G06F 2217/80
(Continued)

(56) References Cited

U.S. PATENT DOCUMENTS 7,222,060 B2 * 5/2007 Shimizu .............. G06F 17/5036
257/499
7,598,541 B2 * 10/2009 Okamoto .......... H01L 21/82348
257/205
(Continued)

FOREIGN PATENT DOCUMENTS

| CN | 102542094 A | 7/2012 |
| CN | 102646147 A | 8/2012 |
| KR | 20080020417 A * | 3/2008 |

OTHER PUBLICATIONS

"International Search Report dated Sep. 29, 2014," International Application No. PCT/CN2014/076252, 14 pages.

*Primary Examiner* — Kibrom K Gebresilassie
*Assistant Examiner* — Justin C Mikowski
(74) *Attorney, Agent, or Firm* — Chernoff Vilhauer LLP

(57) ABSTRACT

The invention discloses an STI stress effect modeling method and device of an MOS device, and belongs to the technical field of parameter extraction modeling of devices. The method comprises the following steps: introducing the influence of temperature parameters on the STI stress effect of the MOS device, so as to form a function showing that the STI stress effect of the MOS device changes along with the temperature parameters; extracting the model parameter Model1 of the MOS device at normal temperature; on the basis of the Model1, extracting the parameter Model2 that the STI stress affects the properties of the MOS device at normal temperature; and on the basis of the Model2, extracting fitting parameters of the MOS device in the function so as to acquire final model parameters. The device comprises (Continued)

a first module, a second module, a third module and a fourth module. By establishing the function showing that the STI stress effect of the MOS device changes along with the temperature parameters, the influence of the temperature on the STI stress effect of the MOS device can be accurately described, so that the extracted model parameters are more accurate and reliable.

7 Claims, 3 Drawing Sheets

(58) Field of Classification Search
USPC .......................................................... 703/14
See application file for complete search history.

(56) References Cited

U.S. PATENT DOCUMENTS

| 2006/0145266 | A1* | 7/2006 | Zushi | H01L 27/0207 |
| | | | | 257/369 |
| 2008/0077378 | A1* | 3/2008 | Ikoma | G06F 17/5022 |
| | | | | 703/14 |
| 2009/0064062 | A1* | 3/2009 | Vogt | G06F 17/5036 |
| | | | | 716/106 |
| 2014/0089877 | A1* | 3/2014 | Salem | G06F 17/5081 |
| | | | | 716/112 |

\* cited by examiner

STI STRESS EFFECT MODELING METHOD AND DEVICE OF AN MOS DEVICE

RELATED APPLICATIONS

This application is a United States National Stage Application filed under 35 U.S.C 371 of PCT Patent Application Serial No. PCT/CN2014/076252, filed Apr. 25, 2014, which claims Chinese Patent Application Serial No. CN 201410040388.8, filed Jan. 28, 2014, the disclosure of all of which are hereby incorporated by reference in their entirety.

TECHNICAL FIELD

The present invention relates to the technical field of parameter extraction modeling of devices, and in particular relates to an STI stress effect modeling method and device of an MOS device.

BACKGROUND OF THE INVENTION

With increasingly high complexity and increasingly small size of integrated circuit design, an isolation technology plays an increasingly important role in integrated circuit manufacturing. The isolation technology in the CMOS (Complementary Metal Oxide Semiconductor) process mainly includes dielectric material isolation, reverse PN junction isolation and the like, wherein the dielectric material isolation has an outstanding performance in eliminating parasitic transistors, reducing the working capacitance, inhibiting the latch-up effect of MOS (Metal Oxide Semiconductor) transistors and the like. In preparation processes of 3-0.35 μm, a local oxidation of silicon (LOCOS) process is widely used, but this preparation process has the following defects: (1) field silicon dioxide invades an active region due to a bird's beak structure; (2) the narrow width effect of an active device is caused by redistribution of field oxygen implantation in a high-temperature process; (3) the field silicon dioxide becomes thin in a narrow isolated region; and (4) an uneven surface shape is produced. These defects are particularly outstanding in preparation process nodes of 0.18 μm and less, so that the LOCOS preparation process is no longer appropriate. With the development of devices from deep submicron to nanometer, a shallow trench isolation (STI) technology has substituted the LOCOS technology and becomes a mainstream isolation technology. Compared with the LOCOS technology, the STI technology has the advantages of complete evenness and good latch-up resistance, and completely has no bird's beak; and the STI technology may avoid the high temperature process, reduce the junction spacing and the junction capacitance, ensure the region of the active region and improve the integration level.

With reduction of the area of the active region of a device, the influence of the STI stress on the performance of the device would not be neglected, so that the performance of the device is strongly related to the area of the active region of the device and the position of the device in the active region; and the STI stress not only affects the threshold voltage of the device, but also affects the carrier mobility of the device. An existing commercial MOSFET (Metal Oxide Semiconductor Field Effect Transistor) standard model BSIM4 is molded on the STI stress effect, and mainly involves the influence of the stress on the threshold voltage and the mobility. According to researches, the temperature has a great influence on the STI stress effect, the low temperature would strengthen the STI stress and then increase the influence on the performance of the device, and this is not sufficiently considered in the standard model BSIM4, so that extracted model parameters are not accurate enough.

SUMMARY OF THE INVENTION

The technical problem to be solved by the present invention is to provide an STI stress effect modeling method and device of an MOS device for improving the precision of extracted model parameters.

To solve the above-mentioned technical problem, in an aspect of the present invention, there is provided an STI stress effect modeling method of an MOS device, includes: introducing temperature parameters affecting the STI stress effect of the MOS device into model parameters of a BSIM4, and establishing a function showing that the STI stress effect of the MOS device changes along with the temperature parameters;

extracting the model parameter Model1 of the MOS device at normal temperature according to the output property and transfer property of the MOS device in the absence of the STI stress;

extracting the parameter that the STI stress affects the properties of the MOS device at normal temperature on the basis of the model parameter Model1, wherein the extracted model parameter is marked as Model2; and extracting fitting parameters of the MOS device in the function that the STI stress effect of the MOS device changes along with the temperature parameters at a non-normal temperature on the basis of the model parameter Model2 so as to acquire final model parameters.

Further, in the absence of the STI stress, the source-end active region width, source-end active region datum width, drain-end active region width and drain-end active region datum width of the MOS device are all equal.

Further, the step of extracting the parameter that the STI stress affects the properties of the MOS device at normal temperature on the basis of the model parameter Model1, wherein the extracted model parameter is marked as Model2, specifically includes:

acquiring the output property and transfer property of the MOS device with different source-end active region widths and drain-end active region widths; and extracting the parameter that the STI stress affects the properties of the MOS device at normal temperature according to the acquired output property and transfer property of the MOS device and the model parameter Model1, wherein the extracted model parameter is marked as Model2.

Further, the step of extracting fitting parameters of the MOS device in the function that the STI stress effect of the MOS device changes along with the temperature parameters at a non-normal temperature on the basis of the model parameter Model2 so as to acquire final model parameters, specifically includes:

acquiring the output property and transfer property of the MOS device with different source-end active region widths and drain-end active region widths at the non-normal temperature; and extracting the fitting parameters kual and kubl of the MOS device in the function that the STI stress effect of the MOS device changes along with the temperature parameters according to the acquired output property and transfer property of the MOS device and the model parameter Model2 so as to acquire final model parameters.

In another aspect of the present invention, there is provided an STI stress effect modeling device of an MOS device, includes:

a first module, a second module, a third module and a fourth module;

the first module is configured to introduce temperature parameters affecting the STI stress effect of the MOS device into model parameters of a BSIM4, and establish a function showing that the STI stress effect of the MOS device changes along with the temperature parameters;

the second module is configured to extract the model parameter Model1 of the MOS device at normal temperature according to the output property and transfer property of the MOS device in the absence of the STI stress;

the third module is configured to extract the parameter that the STI stress affects the properties of the MOS device at normal temperature on the basis of the model parameter Model1, wherein the extracted model parameter is marked as Model2;

the fourth module is configured to extract fitting parameters of the MOS device in the function showing that the STI stress effect of the MOS device changes along with the temperature parameters at a non-normal temperature on the basis of the model parameter Model2 so as to acquire final model parameters.

Further, the third module includes:

a first acquisition unit, a first extraction unit and a marking unit;

the first acquisition unit is configured to acquire the output property and transfer property of the MOS device with different source-end active region widths and drain-end active region widths;

the first extraction unit is configured to extract the parameter that the STI stress affects the properties of the MOS device at normal temperature according to the acquired output property and transfer property of the MOS device and the model parameter Model1; and the marking unit is configured to mark the extracted model parameter as Model2.

Further, the fourth module includes:

a second acquisition unit and a second extraction unit;

the second acquisition unit is configured to acquire the output property and transfer property of the MOS device with different source-end active region widths and drain-end active region widths at a non-normal temperature;

the second extraction unit is configured to extract the fitting parameters kual and kub1 of the MOS device in the function showing that the STI stress effect of the MOS device changes along with the temperature parameters according to the acquired output property and transfer property of the MOS device and the model parameter Model2 so as to acquire final model parameters.

According to the STI stress effect modeling method and device of the MOS device in the present invention, the temperature parameters affecting the STI stress effect of the MOS device are introduced into the model parameters of the BSIM4, and the function showing that the STI stress effect of the MOS device changes along with the temperature parameters is established, so that the influence of the temperature on the STI stress effect of the MOS device may be described more accurately, and the extracted model parameters are more accurate and reliable.

DETAILED DESCRIPTION OF THE PRESENTLY PREFERRED EMBODIMENTS

There is provided an STI stress effect modeling method of an MOS device in the preferred embodiment of the present application, includes:

step S1, temperature parameters affecting the STI stress effect of the MOS device are introduced into model parameters of a BSIM4, and a function showing that the STI stress effect of the MOS device changes along with the temperature parameters is established;

step S2: the model parameter Model1 of the MOS device at normal temperature is extracted according to the output property and transfer property of the MOS device in the absence of the STI stress.

To make the objectives, technical schemes and advantages of the present invention clearer, the present invention will be further described in detail below in combination with specific embodiments and with reference to the accompanying drawings. This embodiment is described by using an H-shaped gate device under a 0.13 um SOI preparation process of the Institute of Microelectronics of Chinese Academy of Sciences as an example.

Figure 1:
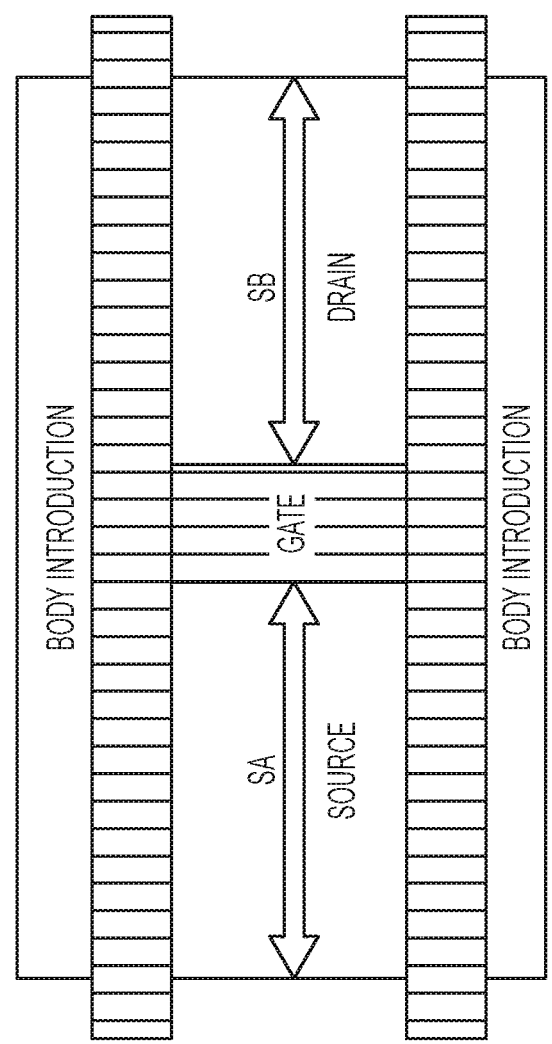
FIG. 1 is a layout schematic diagram of an MOS device in the preferred embodiment of the present application.

As shown in FIG. 1, an MOS device with different source-end active region widths (expressed as SA) and drain-end active region widths (expressed as SB) is manufactured, and for the purpose of simplification, let SA=SB. The SA widths are respectively 0.34 um, 0.6 um, 1 um and 5 um.

The transfer property (Id_Vg) and output property (Id_Vd) of the MOS device are tested at normal temperature of 25° C. when SA=saref=SB=sbref=5 um, the model parameter Model1 of the MOS device at 25° C. is extracted, and at the moment, the STI stress of the MOS device is basically zero. Wherein, saref is a source-end active region datum width, and sbref is a drain-end active region datum width.

Step S3, the parameter that the STI stress affects the properties of the MOS device at normal temperature is extracted on the basis of the model parameter Model1, and the extracted model parameter is marked as Model2.

In this embodiment, the output property and transfer property of the MOS device when the source-end active region widths SA are 0.34 um, 0.6 um, 1 um and 5 um are acquired respectively, the parameter that the STI stress affects the properties of the MOS device at a normal temperature of 25° C. is extracted according to the acquired output property and transfer property and the model parameter Model1, and the extracted model parameter is marked as Model2.

Step S4, fitting parameters of the MOS device in the function showing that the STI stress effect of the MOS device changes along with the temperature parameters at a non-normal temperature are extracted on the basis of the model parameter Model2, so as to acquire final model parameters. The applied temperature should satisfy the condition that the MOS device may work normally, and the temperature parameter value should include the highest temperature value and the lowest temperature value when the MOS device works normally, so that more accurate final model parameters may be acquired.

In this embodiment, when the source-end active region widths SA are 0.34 um, 0.6 um, 1 um and 5 um at the temperature of −55° C., −30° C., 0° C., 15° C., 48° C., 80° C. and 125° C., the output property and transfer property of the MOS device are acquired respectively, and the fitting parameters kual and kubl of the MOS device in the function showing that the STI stress effect of the MOS device changes along with the temperature parameters are extracted according to the measured output property and transfer property and the model parameter Model2, so as to acquire the final model parameters.

Codes are shown as follows:

```
.param
+ ua0 = 1.95E−9    ub0 = 9.305E−19    saref = 5E−6
+sbref = 5E−6 kual = 0    kubl = −4E−21
.subckt pmosstress    D G S E B    w = 10u    l = 10u
SA =5E−6  SB = 5E−6 dtemp = 0.
.param
+kua = 'kual * ( ( S A−saref) /saref+ ( SB −sbref) /sbref) *
dtemp' ua = 'uaO+kua'
+kub = 'kub 1 * ( ( S A−saref) /saref+ ( SB−sbref) /sbref) *
dtemp' ub = 'ubO+kub'
    Ml D G S E B pmos w=w 1=1 SA=SA SB=SB dtemp=dtemp
    .model pmos pmos
    + level = 70    ua = 'ua'    ub = 'ub'    saref = 'saref
    sbref = 'sbref
    ...
    .ends pmosstress
``` wherein, ua0 and ub0 are a first-order mobility degradation coefficient and a second-order mobility degradation coefficient irrelevant to the STI stress. Kual and Kubl are fitting coefficients.

Since Ua is the first-order mobility degradation coefficient and Ub is the second-order mobility degradation coefficient, it could be seen from the given formula that, due to the introduction of the kual, ua is relevant to temperature, SA and SB (SA and SB are directly relevant to the stress), so the introduction of kual practically introduces the influence of the temperature on the STI stress, and then the first-order mobility degradation coefficient is affected. The action of kubl is same. Accordingly, Kua is a first-order mobility degradation coefficient relevant to both the temperature and the stress, and kual is a fitting coefficient. Kub is a second-order mobility degradation coefficient relevant to both the temperature and the stress, and kubl is a fitting coefficient.

Figure 2:
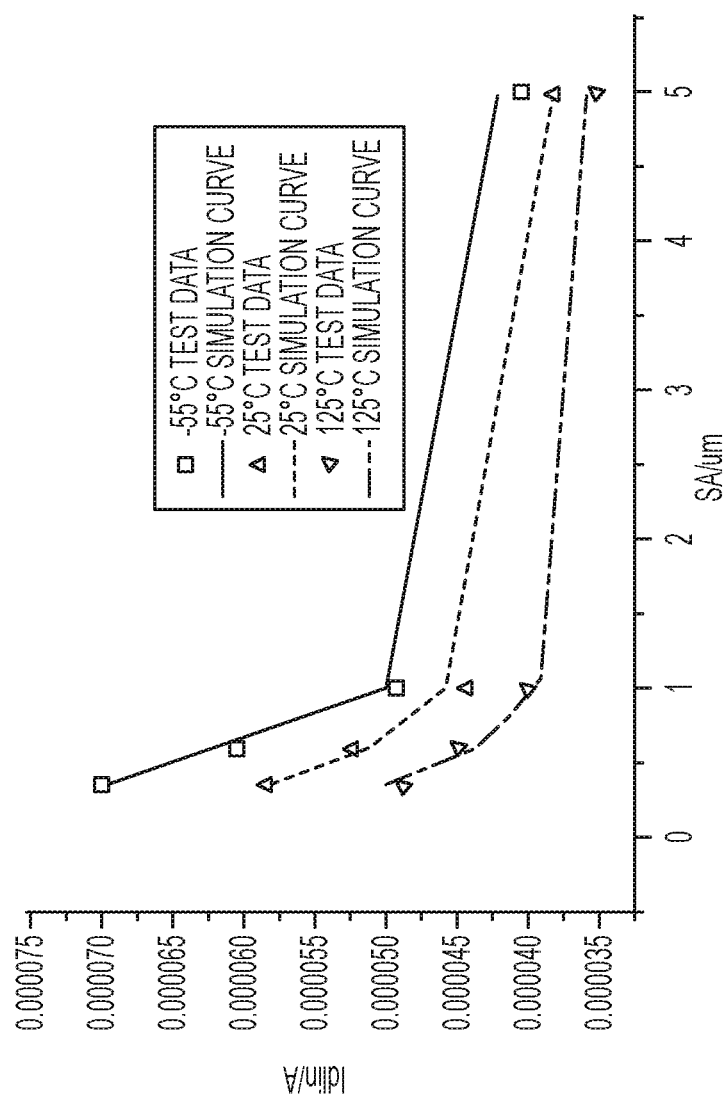
FIG. 2 shows test data of Idlin (saturation current in linear region) of a device with different SA (SB) at different temperatures and simulated contrast curves of a model proposed by the present invention.
Figure 3:
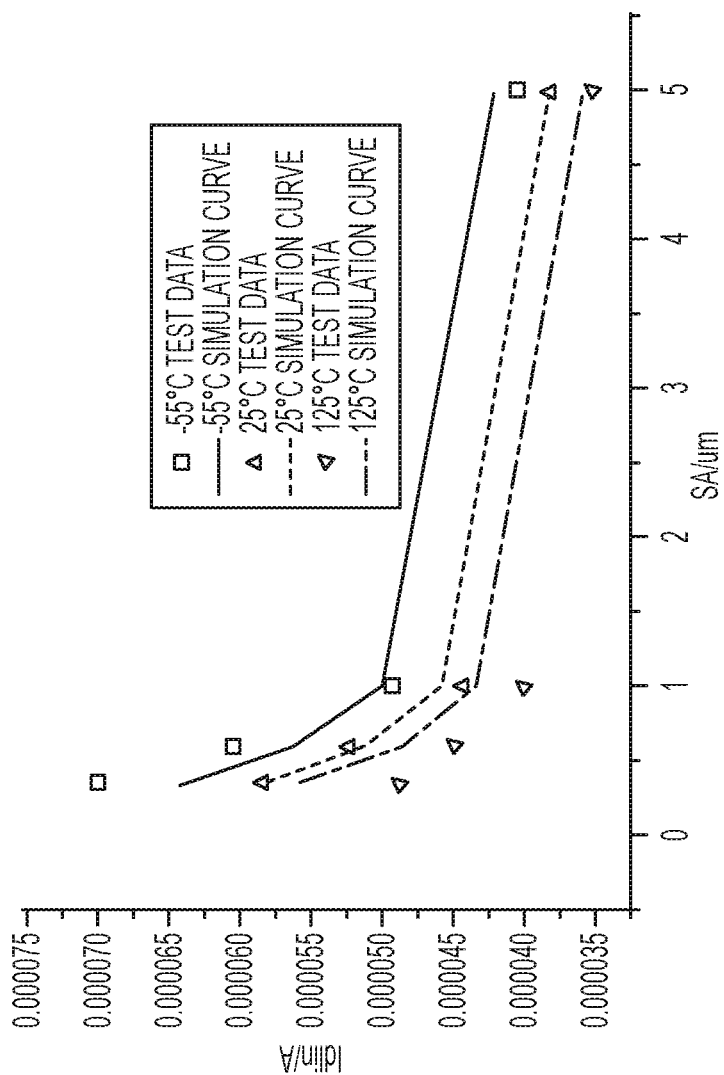
FIG. 3 shows test data of Idlin (saturation current in linear region) of the device with different SA (SB) at different temperatures and simulated contrast curves of a standard model BSIM4SOI.

A model is established through the STI stress effect modeling method for the MOS device in the present invention. FIG. 2 shows test data of Idlin (saturation current in linear region) of a device with different SA (SB) at the temperature of −55° C., 25° C. and 125° C. and simulated contrast curves of a model proposed by the present invention, and is mainly used for describing that the model may well fit the influence of the temperature on the STI stress. FIG. 3 shows test data of Idlin (saturation current in linear region) of the device with different SA (SB) at the temperature of −55° C., 25° C. and 125° C. and simulated contrast curves of a standard model BSIM4SOI, and is mainly used for describing that the standard model is difficult to fit such a phenomenon. It could be seen by contrast of FIG. 2 and FIG. 3 that, the model provided by the present invention well fits the test data, and reflects the influence of the temperature on the STI stress more accurately and reliably.

The present invention further provides an STI stress effect modeling device of an MOS device, including: a first module, a second module, a third module and a fourth module; the first module is configured to introduce temperature parameters affecting the STI stress effect of the MOS device into model parameters of a BSIM4, and establish a function showing that the STI stress effect of the MOS device changes along with the temperature parameters; the second module is configured to extract the model parameter Model1 of the MOS device at normal temperature according to the output property and transfer property of the MOS device in the absence of the STI stress; the third module is configured to extract the parameter that the STI stress affects the properties of the MOS device at normal temperature on the basis of the model parameter Model1, wherein the extracted model parameter is marked as Model2; and the fourth module is configured to extract fitting parameters of the MOS device in the function showing that the STI stress effect of the MOS device changes along with the temperature parameters at a non-normal temperature on the basis of the model parameter Model2 so as to acquire final model parameters.

Wherein, the third module includes: a first acquisition unit, a first extraction unit and a marking unit; the first acquisition unit is configured to acquire the output property and transfer property of the MOS device with different source-end active region widths and drain-end active region widths; the first extraction unit is configured to extract the parameter that the STI stress affects the properties of the MOS device at normal temperature according to the acquired output property and transfer property of the MOS device and the model parameter Model1; and the marking unit is configured to mark the extracted model parameter as Model2.

The fourth module includes: a second acquisition unit and a second extraction unit; the second acquisition unit is configured to acquire the output property and transfer property of the MOS device with different source-end active region widths and drain-end active region widths at a non-normal temperature; the second extraction unit is configured to extract the fitting parameters kual and kubl of the MOS device in the function that the STI stress effect of the MOS device changes along with the temperature parameters according to the acquired output property and transfer property of the MOS device and the model parameter Model2 so as to acquire final model parameters.

According to the STI stress effect modeling method and device of the MOS device in the present invention, the temperature parameters affecting the STI stress effect of the MOS device are introduced into the model parameters of the BSIM4, and the function showing that the STI stress effect of the MOS device changes along with the temperature parameters is established, so that the influence of the temperature on the STI stress effect of the MOS device may be described more accurately, and the extracted model parameters are more accurate and reliable.

Finally, it should be noted that, the aforementioned embodiments are merely used for describing the technical solutions of the present invention, rather than limiting the present invention; though the present invention is described in detail with reference to the aforementioned embodiments, it should be understood by those of ordinary skills in the art that modifications or equivalent substitutes may be made to the technical solutions of the present invention without departing from the spirit and scope of the present invention; and the modifications or equivalent substitutes should be included in the scope of the claims of the present invention.

The invention claimed is:

1. A method of designing an integrated circuit based on a Berkeley Short-channel Insulated-gate field-effect transistor Model version 4 (BSIM4 Model), the method comprising:

modeling a shallow-trench-isolation (STI) stress effect of a Metal Oxide Semiconductor (MOS) device on a physical computer on the BSIM4 Model, including:

introducing temperature parameters affecting the STI stress effect of the MOS device into model parameters of the BSIM4 Model, and establishing a function showing how the STI stress effect of the MOS device changes along with the temperature parameters;

extracting the model parameter Model1 of the MOS device at normal temperature according to the output property and transfer property of the MOS device in the absence of the STI stress;

extracting the parameter that the STI stress affects the properties of the MOS device at normal temperature on the basis of the model parameter Model1, wherein the extracted model parameter is marked as Model2; and extracting fitting parameters of the MOS device in the function of the BSIM4 Model showing how the STI stress effect of the MOS device changes along with the temperature parameters at a non-normal temperature on the basis of the model parameter Model2 so as to acquire final model parameters; and using the BSIM4 Model to design the integrated circuit based on the acquired final model parameters for the BSIM4 Model.

2. The method of claim 1, wherein in the absence of the STI stress, the source-end active region width, source-end active region datum width, drain-end active region width and drain-end active region datum width of the MOS device are all equal.

3. The method of claim 1, wherein the step of extracting the parameter that the STI stress affects the properties of the MOS device at normal temperature on the basis of the model parameter Model1, wherein the extracted model parameter is marked as Model2, specifically includes:

acquiring the output property and transfer property of the MOS device with different source-end active region widths and drain-end active region widths; and extracting the parameter that the STI stress affects the properties of the MOS device at normal temperature according to the acquired output property and transfer property of the MOS device and the model parameter Model1, wherein the extracted model parameter is marked as Model2.

4. The method of claim 1, wherein the step of extracting fitting parameters of the MOS device in the function showing how the STI stress effect of the MOS device changes along with the temperature parameters at a non-normal temperature on the basis of the model parameter Model2 so as to acquire final model parameters, specifically includes:

acquiring the output property and transfer property of the MOS device with different source-end active region widths and drain-end active region widths at the non-normal temperature; and extracting the fitting parameters kual and kubl of the MOS device in the function showing that the STI stress effect of the MOS device changes along with the temperature parameters according to the acquired output property and transfer property of the MOS device and the model parameter Model2 so as to acquire final model parameters for the BSIM4 Model.

5. A system for designing an integrated circuit, the system comprising:

a physical computer;

a program executable by the computer, the program including a first module, a second module, a third module and a fourth module;

the first module is configured to introduce temperature parameters affecting the STI stress effect of the MOS device into model parameters of a BSIM4 Model, and establish a function on the BSIM4 Model showing how the STI stress effect of the MOS device changes along with the temperature parameters;

the second module is configured to extract the model parameter Model1 of the MOS device at normal temperature according to the output property and transfer property of the MOS device in the absence of the STI stress;

the third module is configured to extract the parameter that the STI stress affects the properties of the MOS device at normal temperature on the basis of the model parameter Model1, wherein the extracted model parameter is marked as Model2;

the fourth module is configured to extract fitting parameters of the MOS device in the function on the BSIM4 Model showing how the STI stress effect of the MOS device changes along with the temperature parameters at a non-normal temperature on the basis of the model parameter Model2 so as to acquire final model parameters for the BSIM4 Model; and the BSIM4 Model executable by the computer and configured to design an integrated circuit based on the acquired final model parameters for the BSIM4 Model.

6. The system of claim 5, wherein the third module includes:

a first acquisition unit, a first extraction unit and a marking unit;

the first acquisition unit is configured to acquire the output property and transfer property of the MOS device with different source-end active region widths and drain-end active region widths;

the first extraction unit is configured to extract the parameter that the STI stress affects the properties of the MOS device at normal temperature according to the acquired output property and transfer property of the MOS device and the model parameter Model1; and the marking unit is configured to mark the extracted model parameter as Model2.

7. The system of claim 5, wherein the fourth module includes:

a second acquisition unit and a second extraction unit;

the second acquisition unit is configured to acquire the output property and transfer property of the MOS device with different source-end active region widths and drain-end active region widths at a non-normal temperature;

the second extraction unit is configured to extract the fitting parameters kual and kubl of the MOS device in the function showing how the STI stress effect of the MOS device changes along with the temperature parameters according to the acquired output property and transfer property of the MOS device and the model parameter Model2 so as to acquire final model parameters for the BSIM4 Model.

* * * * *